US 8,164,706 B2

(12) United States Patent
Nambo et al.

(10) Patent No.: US 8,164,706 B2
(45) Date of Patent: Apr. 24, 2012

(54) LIQUID CRYSTAL DISPLAY DEVICE AND BOARD CLIP MOUNTABLE ON THE LIQUID CRYSTAL DISPLAY DEVICE

(75) Inventors: Saori Nambo, Osaka (JP); Eriko Wakabayashi, Osaka (JP); Masanori Shimo, Osaka (JP); Takafumi Hara, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/143,361

(22) PCT Filed: Dec. 24, 2009

(86) PCT No.: PCT/JP2009/071493
§ 371 (c)(1),
(2), (4) Date: Jul. 6, 2011

(87) PCT Pub. No.: WO2010/082440
PCT Pub. Date: Jul. 22, 2010

(65) Prior Publication Data
US 2011/0267556 A1    Nov. 3, 2011

(30) Foreign Application Priority Data
Jan. 15, 2009    (JP) ................................. 2009-006424

(51) Int. Cl.
*G02F 1/1333*    (2006.01)
(52) U.S. Cl. .................. 349/58; 349/1; 349/13; 349/14; 349/56; 349/60

(58) Field of Classification Search ................. 349/1, 13, 349/14, 56, 58, 60
See application file for complete search history.

(56) References Cited

U.S. PATENT DOCUMENTS
| | | | |
|---|---|---|---|
| 6,220,741 B1 * | 4/2001 | Kawachi et al. | 362/561 |
| 6,392,723 B1 * | 5/2002 | Sugiyama et al. | 349/58 |
| 7,551,241 B2 * | 6/2009 | Fukuda | 349/58 |
| 2003/0098940 A1 | 5/2003 | Lee | |
| 2008/0079864 A1 | 4/2008 | Nishimura | |

FOREIGN PATENT DOCUMENTS
| | | |
|---|---|---|
| JP | 05-273572 A | 10/1993 |
| JP | 2003-195267 A | 7/2003 |
| JP | 2008-083460 A | 4/2008 |
| JP | 2008-083584 A | 4/2008 |

OTHER PUBLICATIONS
Official Communication issued in International Patent Application No. PCT/JP2009/071493, mailed on Mar. 2, 2010.

* cited by examiner

*Primary Examiner* — Jennifer Doan
(74) *Attorney, Agent, or Firm* — Keating & Bennett, LLP (57) ABSTRACT

In a liquid crystal display device 100 provided by the present invention, at least a part of a circuit board 16 can be held on an outer side surface 30B of a frame 30 by a board clip 50 mounted on the outer side surface 30B of the frame 30. The board clip 50 includes a plate-like main body portion 52 located so as to face the outer side surface 30B of the frame 30, front-side engaging portions 54 and 55, and a pair of rear-side engaging portions 56 and 57. A bezel receiving portion 60 contactable with a part of a peripheral portion of a bezel 20 is formed in the vicinity of the front-side engaging portions 54 and 55.

7 Claims, 6 Drawing Sheets

LIQUID CRYSTAL DISPLAY DEVICE AND BOARD CLIP MOUNTABLE ON THE LIQUID CRYSTAL DISPLAY DEVICE

TECHNICAL FIELD

The present invention relates to a liquid crystal display device including a liquid crystal panel, and a board clip mountable on the liquid crystal display device. The present application claims the benefit of priority based upon Japanese Patent Application No. 2009-006424 filed on Jan. 15, 2009, the entirety of which is incorporated herein by reference.

BACKGROUND ART

Recently, liquid crystal display devices including a liquid crystal panel having a rectangular shape are in wide use as image display devices (displays) for TVs, personal computers and the like.

Such a liquid crystal display device includes a bezel (front frame) on the front side of the liquid crystal panel. On the rear side of the liquid crystal panel, a frame (e.g., a resin frame is also referred to as a "P chassis (plastic chassis)") is provided between the panel and a backlight device, which is a light source for the panel. The bezel and the frame are each formed to have a frame-like shape surrounding a rectangular display area (active area) located in a central area of the liquid crystal panel, and hold a rectangular peripheral portion of the liquid crystal panel from the front side and the rear side of the panel.

The liquid crystal panel is provided with various electronic components for displaying images (videos). In one embodiment thereof, one end of a flexible wiring board (referred to as the "flexible printed circuit board" or "FPC") is connected to a wiring section provided in the peripheral portion of the liquid crystal panel, and the other end of the flexible wiring board is connected to any of various circuit boards. In such an embodiment of the liquid crystal panel, the circuit board connected via the flexible wiring board (i.e., the circuit board connected to the panel while being away from the panel positionally) is located on an outer side surface of the frame, which is located on the rear side of the liquid crystal panel, utilizing the flexibility of the flexible wiring board and is held at this position.

One method for holding, at a prescribed position, the circuit board located on the outer side surface of the frame is to use a special circuit board holding tool which is mountable on the outer side surface of the frame. For example, Patent Document 1 describes a technique of using a board fixing screw as such a special tool to fix a circuit board (with the screw) on the outer side surface of the frame. However, such a fixation technique using a screw fixes the circuit board to be mounted, forcibly on the outer side surface of the frame. This is not preferable because when the liquid crystal panel is moved by a minute distance by vibration or the like during transportation, the flexible wiring board connecting the liquid crystal panel and the circuit board may be disrupted.

Instead of the tool of forcible fixation such as the above-mentioned screw, a clip-shaped tool (hereinafter, referred to as the "board clip") mountable on the outer side surface of the frame is used. Such a board clip is structured to be mounted on the outer side surface of the frame while a circuit board is held between the clip and the outer side surface of the frame. Owing to such a structure, the clip can hold the circuit board at a prescribed position on the outer side surface of the frame while permitting the circuit board to be deformed, for example, warped, to some extent. In addition, the circuit board is not fixed in a longitudinal direction of the frame and is freely movable only in one direction. Thus, even when the liquid crystal panel is moved by a minute distance, the circuit board moves in conformity thereto and so the flexible wiring board is prevented from being disrupted.

Citation List
Patent Document
Patent Document 1: Japanese Patent Laid-Open Publication No. 2008-83584

SUMMARY OF THE INVENTION

Technical Problem

The conventional board clip, although being capable of solving the problem of the disruption of the flexible wiring board as described above, still has points to be improved; for example, the board clip moves unsteadily at a prescribed mounting position.

The present invention, made in light of the above-described problems of the conventional art, has a main object of providing a board clip which can be kept mounted more stably and a liquid crystal display device including a circuit board held at a prescribed position on an outer side surface of a frame by the board clip.

Solution to the Problem

In order to achieve the above-described objects, a liquid crystal display device provided by the present invention includes a liquid crystal panel having a rectangular shape; a frame of a frame-like shape located on the rear side of the liquid crystal panel; and a bezel of a frame-like shape located on the front side of the liquid crystal panel. The liquid crystal panel is held between the frame and the bezel; and a peripheral portion of at least one side of the liquid crystal panel is connected to a circuit board via a flexible wiring board. At least a part of the circuit board is held on an outer side surface of the frame by a board clip mounted on the outer side surface of the frame.

The board clip includes a plate-like main body portion located so as to face the outer side surface of the frame when the board clip is mounted, a front-side engaging portion provided at one end of the main body portion and engaged with a front-side clip attaching portion provided in the frame when the board clip is mounted, and a rear-side engaging portion provided at the other end of the main body portion and engaged with a rear-side clip attaching portion provided in the frame when the board clip is mounted. The board clip further has a bezel receiving portion formed in the vicinity of the front-side engaging portion and contactable with a part of a peripheral portion of the bezel when the bezel is located at a prescribed position such that the liquid crystal panel is held.

In this specification and the claims, the "front side" means the side of the liquid crystal display device and the liquid crystal panel on which video is displayed (i.e., the side facing the viewer), and the "rear side" means the side opposite to the front side.

In a liquid crystal display device according to the present invention, the board clip has a bezel receiving portion, and is structured such that when the liquid crystal panel is held between the bezel and the frame (in a typical production process, while the frame is located on an operation table with a panel receiving surface facing upward, the liquid crystal panel is located on the panel receiving surface, and the bezel is located thereon), a part of the bezel is also located on the bezel receiving portion of the board clip. Owing to this, any unexpected movement of the board clip can be regulated by the bezel located as described above. Accordingly, a liquid crystal display device having this structure can prevent the board clip from moving unsteadily and stably hold at least a part of the circuit board, connected to the liquid crystal panel via the flexible wiring board, on an outer side surface of the frame.

In a preferable embodiment of the liquid crystal display device disclosed herein, the board clip includes a pair of front-side engaging claws extending from the one end of the main body portion as the front-side engaging portion, and a pair of rear-side engaging claws extending from the other end of the main body portion as the rear-side engaging portion.

The frame has a pair of front-side engaging holes and a pair of rear-side engaging holes which are respectively formed at positions corresponding to the pair of front-side engaging claws and the pair of rear-side engaging claws and are respectively engageable with the pair of front-side engaging claws and the pair of rear-side engaging claws.

In a liquid crystal display device having such a structure, at ends of the plate-like main body portion of the board clip in the front-rear direction of the frame, a pair of front-side engaging claws and a pair of rear-side engaging claws are respectively provided. These claws can be respectively engaged with a pair of front-side engaging holes and a pair of rear-side engaging holes corresponding thereto. Therefore, the board clip can be located at a prescribed position more stably.

In a more preferable embodiment of the liquid crystal display device having the above-described structure, either one of the pair of front-side engaging holes is formed to have a long groove shape, and either one of the pair of rear-side engaging holes is formed to have a long groove shape.

In a liquid crystal display device having such a structure, one of the pair of front-side engaging holes is formed to have a long groove shape, and one of the pair of rear-side engaging holes is formed to have a long groove shape. Owing to this, even when the frame has a processing error or is thermally contracted, an influence of a change in the distance between the engaging holes of such a pair caused by the error or the thermal contraction can be avoided, and engagement failure of the engaging claws and the engaging holes can be prevented.

In another preferable embodiment of the liquid crystal display device disclosed herein, the front-side engaging portion is formed to protrude from the one end of the plate-like main body portion toward the center of the liquid crystal panel when the board clip is mounted on the outer side surface of the frame. On a surface of the front-side engaging portion protruding toward the center of the liquid crystal panel, the surface facing the bezel, a ridge projecting toward an area where the bezel is located is formed as the bezel receiving portion.

In a liquid crystal display device having such a structure, the front-side engaging portion is provided so as to protrude from one end of the plate-like main body portion toward the center of the liquid crystal panel. As a result, the bezel receiving portion can be wider utilizing the protruding portion. By providing the ridge (rib), the bezel can be placed more stably. Therefore, the board clip can be prevented more certainly from moving unsteadily. By providing the ridge (rib), the mechanical strength of the board clip itself (especially, the panel receiving portion) can be improved.

As another aspect, the present invention provides a board clip having the above-described structure. The board clip provided by the present invention is provided in a liquid crystal display device which includes a liquid crystal panel having a rectangular shape, a frame of a frame-like shape located on the rear side of the liquid crystal panel, and a bezel of a frame-like shape located on the front side of the liquid crystal panel; and is mounted on the frame for holding, on an outer side surface of the frame, at least a part of the circuit board connected to a peripheral portion of the liquid crystal panel held between the frame and the bezel via a flexible wiring board.

Such a board clip includes a plate-like main body portion located so as to face the outer side surface of the frame when the board clip is mounted on the frame; a front-side engaging portion provided at an end of the main body portion and engaged with a front-side clip attaching portion provided in the frame when the board clip is mounted; a rear-side engaging portion provided at the other end of the main body portion and engaged with a rear-side clip attaching portion provided in the frame when the board clip is mounted. In the vicinity of the front-side engaging portion, a bezel receiving portion contactable with a part of a peripheral portion of the bezel when the bezel is located at a prescribed position such that the liquid crystal panel is held is formed.

By using the board clip for holding a circuit board according to the present invention, the board clip itself can be prevented from moving unsteadily at a prescribed mounting position as described above. Therefore, at least a part of the circuit board connected to the liquid crystal panel via the flexible wiring board can be stably held on the outer side surface of the frame.

In a preferable embodiment of the board clip disclosed herein, the board clip includes a pair of front-side engaging claws extending from the one end of the main body portion as the front-side engaging portion; and a pair of rear-side engaging claws extending from the other end of the main body portion as the rear-side engaging portion.

The board clip having such a structure has a pair of (two) front-side engaging claws and a pair of (two) rear-side engaging claws, and therefore can be held at a prescribed position on the outer side surface of the frame more stably.

In another preferable embodiment of the board clip, the front-side engaging portion is formed to protrude from the one end of the main body portion toward the center of the liquid crystal panel when the board clip is mounted on the outer side surface of the frame. On a surface of the front-side engaging portion protruding toward the center of the liquid crystal panel, the surface facing the bezel, a ridge projecting toward an area where the bezel is located is formed as the bezel receiving portion.

In the board clip having such a structure, the front-side engaging portion is provided so as to protrude from one end of the plate-like main body portion toward the center of the liquid crystal panel. As a result, the bezel receiving portion can be wider utilizing the protruding portion. Since the ridge (rib) projecting toward an area where the bezel is located is formed as the bezel receiving portion, the bezel can be placed more stably. By providing the ridge (rib), the mechanical strength of the board clip itself (especially, the panel receiving portion) can be improved.

DESCRIPTION OF EMBODIMENTS

Hereinafter, a preferable embodiment of the present invention will be described with reference to the drawings. Elements which are other than the elements specifically described in this specification (e.g., the structure and the form of attachment of the board clip) but are necessary to carry out the present invention (e.g., the structure of, and the method for constructing, the liquid crystal panel; the structure of a light source included in the liquid crystal display device; the electrical circuit used by the driving system of the light source; etc.) may be understood as being the matter of design choice determined by a person of ordinary skill in the art based on the conventional art. The present invention can be carried out based on the contents disclosed in this specification and the technological common knowledge in the art.

In the figures referred to below, members or portions having the same functions may bear the same reference characters and descriptions thereof may not be repeated or may be simplified. In the figures, the relative sizes (length, width, thickness, etc.) do not necessarily reflect the actual relative sizes accurately.

First, with reference to FIG. 1, an overall structure of a liquid crystal display device 100 of an active matrix system (TFT type) according to an embodiment of the present invention will be described.

Figure 1:
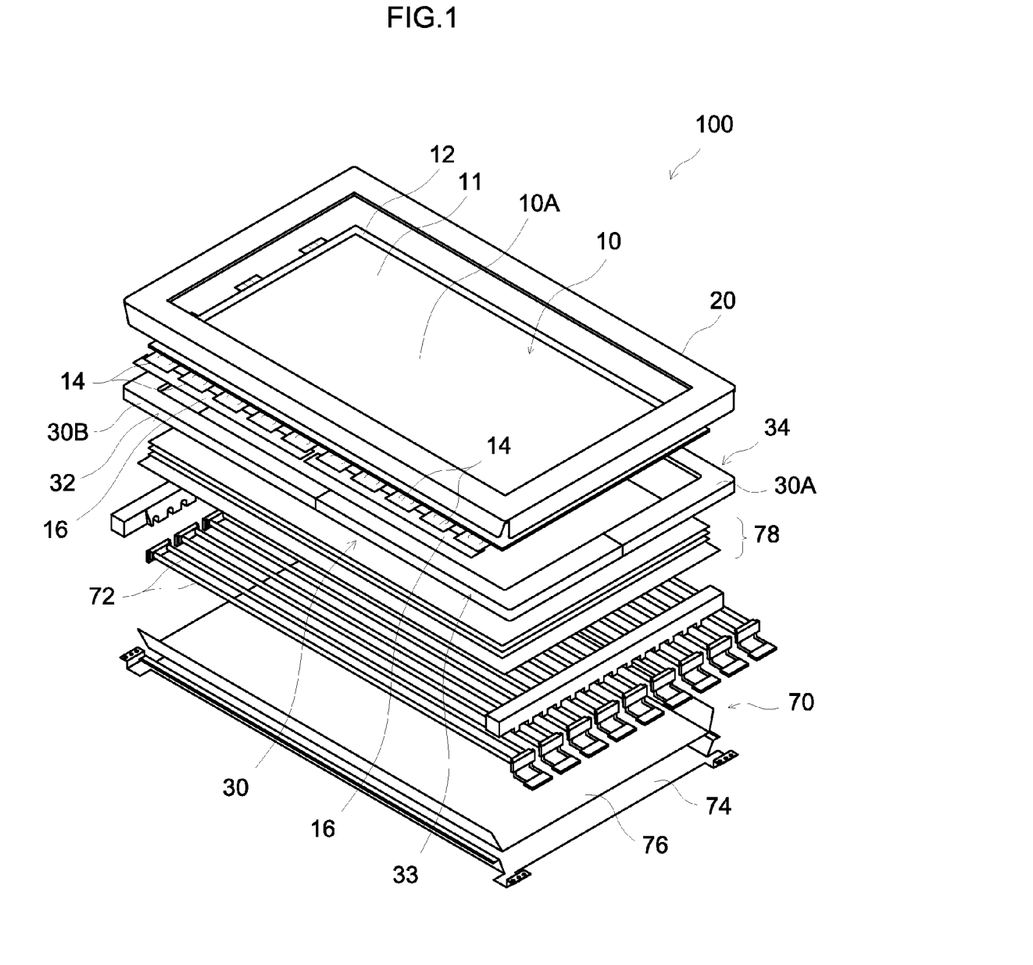
FIG. 1 is an exploded perspective view schematically showing a structure of a liquid crystal display device according to an embodiment of the present invention.

As shown in FIG. 1, the liquid crystal display device 100 according to this embodiment generally includes a liquid crystal panel 10 having a rectangular shape, a frame 30 of a frame-like shape located on the rear side of the liquid crystal panel 10 (i.e., the lower side in FIG. 1), and a bezel (front frame) 20 of a frame-like shape located on the front side of the liquid crystal panel 10 (i.e., the upper side in FIG. 1). On the rear side of the frame 30, a backlight device 70 including a prescribed external light source 72 is provided.

As shown in the figure, the backlight device 70 includes a plurality of linear light sources (e.g., fluorescent tubes, typically, cold-cathode fluorescent tubes) 72 and a case (chassis) 74 for accommodating the light sources 72. The case 74 has a shape of box opened toward the front side. The light sources (fluorescent tubes) 72 are arranged parallel to each other in the case 74, and a reflective member 76 for reflecting light from the light sources 72 toward the viewer's side efficiently is provided between the case 74 and the light sources 72.

On the front side of the light sources 72, a plurality of sheet-like optical members 78 are stacked. The optical members 78 are, for example, a diffuser, a diffusion sheet, a lens sheet and a luminance increasing sheet which are located from the backlight device 70 side toward the liquid crystal panel 10 side sequentially in this order. The optical members 78 are not limited to being this combination of elements or being located in this order. On the rear side of the case 74, an inverter circuit board (not shown) on which an inverter circuit is mounted and an inverter transducer (not shown) as a booster circuit for supplying power to each of the light sources 72 are provided, but these elements do not characterize the present invention and so will not be described.

Now, a structure of the liquid crystal panel 10 and the vicinity thereof will be described.

As shown in FIG. 1, the liquid crystal panel 10 has a generally rectangular overall shape. In a central area of the liquid crystal panel 10, a display area 10A including pixels for displaying an image is formed. Like a usual liquid crystal panel, the liquid crystal panel 10 according to this embodiment has a sandwich structure including a pair of light-transmissive glass substrates 11 and 12 facing each other and a liquid crystal layer (not shown) confined therebetween. As each of the substrates 11 and 12, a substrate cut from a large mother member called "mother glass" during a production process thereof is used. Among the pair of substrates 11 and 12, the substrate on the front side is a color filter substrate (CF substrate) 11, and the substrate on the rear side is an array substrate (TFT substrate) 12.

As shown in the figure, on a peripheral portion of at least one side of the liquid crystal panel 10 (here, the array substrate 12) (in FIG. 1, on the peripheral portion of one of two longer sides, i.e., the side closer to the viewer of the figure), one ends of flexible wiring boards 14 are mounted. The flexible wiring boards 14 are electrically connected to a TFT circuit (pixel section, not shown) formed in the array substrate 12. In this embodiment, a liquid crystal driver IC (not shown) is mounted on each flexible wiring board 14 to form a semiconductor device, specifically, a so-called COF (Chip on Film). On the other end of flexible wiring boards 14, printed circuit boards 16 are connected. On each circuit board 16 according to this embodiment, a power supply circuit for outputting a prescribed voltage, a timing controller for performing processing based on a signal input from an external device, and the like are formed, although the present invention is not limited to this. A detailed structure of the circuit board 16 and the flexible wiring board 14 (COF) may be substantially the same as that adopted in a conventional liquid crystal display device and does not characterize the present invention, and so will not be further described.

The rectangular liquid crystal panel 10 having the above-described structure is held between the bezel 20 located on the front side thereof and the frame 30 located on the rear side thereof. More specifically, the liquid crystal panel 10 is placed on a front surface 30A of the frame 30 of the frame-like shape, which has an opening at a portion corresponding to the display area 10A of the liquid crystal panel 10. On the front side of the liquid crystal panel 10, the bezel of the frame-like shape, which has an opening at a portion corresponding to the display area 10A of the liquid crystal panel 10, is mounted. The bezel 20 and the frame 30 are coupled to each other by coupling means such as a screw or the like (not shown) while having the liquid crystal panel 10 therebetween. Thus, the liquid crystal panel 10 is held between the bezel 20 and the frame 30. In this state, the circuit board 16 is located on an outer side surface 30B of the frame 30 utilizing the flexibility of the flexible wiring board 14, and is held at this position by a board clip 50 (see FIG. 3). This will be described later.

Like a conventional liquid crystal display device, the liquid crystal display device 100 including the liquid crystal panel 10, the backlight device 70 and the like having the above-described structure controls liquid crystal molecules in the liquid crystal layer by applying a controlled voltage to the array substrate 12 and the CF substrate 11 from the circuit board 16 and the flexible wiring board 14, so that the light from the backlight device 70 can pass through, or can be blocked by, the liquid crystal panel 10. The liquid crystal display device 100 can display a desired image in the display area 10A of the liquid crystal panel 10 while controlling the luminance or the like of the backlight device 70.

Figure 2:
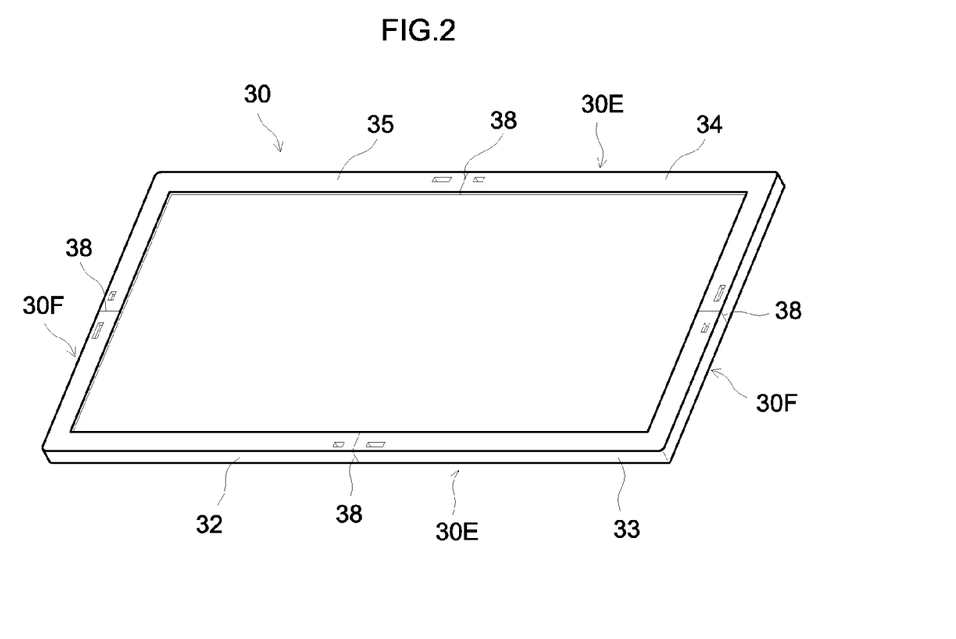
FIG. 2 is a plan view schematically showing a frame according to the embodiment.
Figure 3:
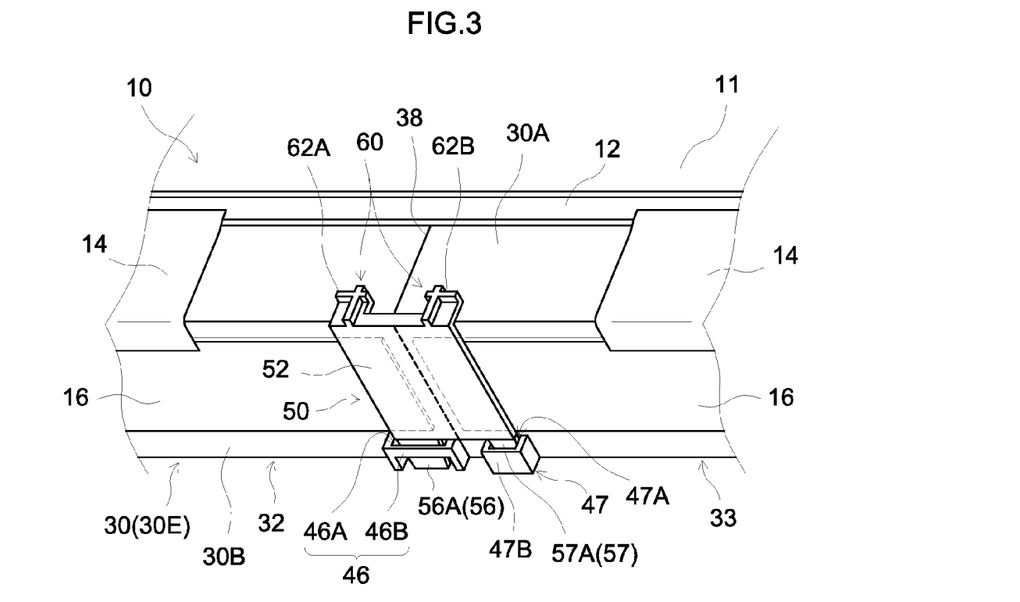
FIG. 3 is a perspective view schematically showing a board clip according to the embodiment in the state of being mounted on an outer side surface of the frame.
Figure 4A:
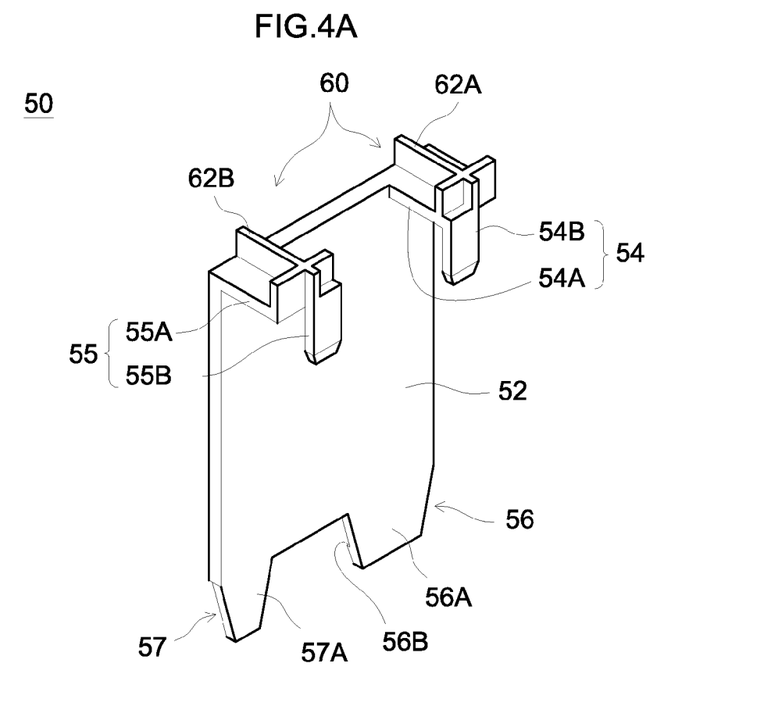
FIG. 4A is a perspective view of the board clip according to the embodiment showing a shape thereof.
Figure 4B:
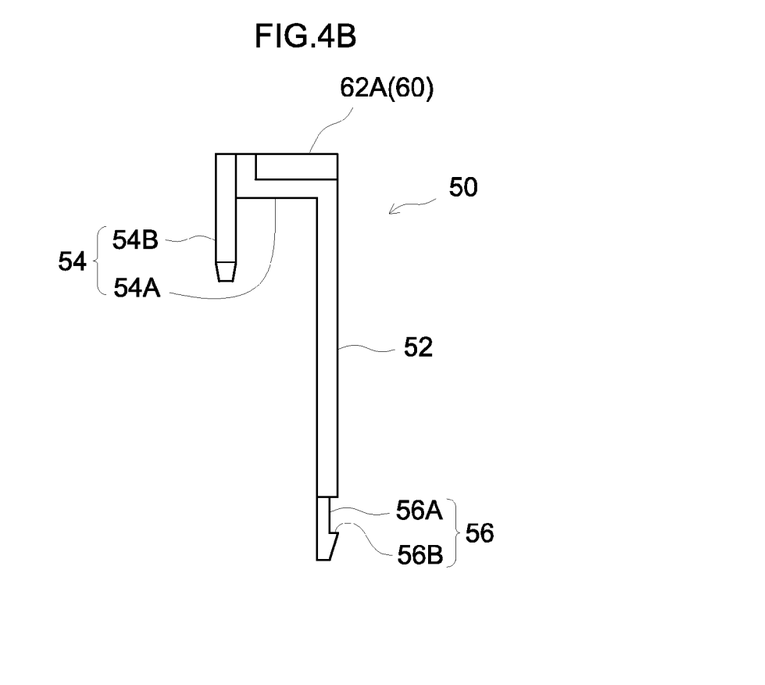
FIG. 4B is a side view of the board clip according to the embodiment showing the shape thereof.
Figure 4C:
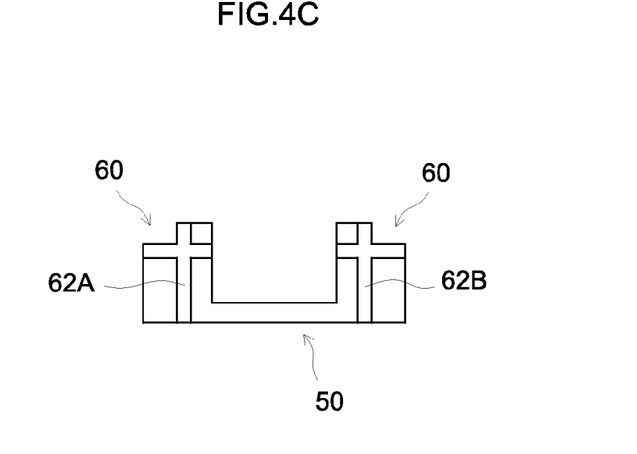
FIG. 4C is a plan view of the board clip according to the embodiment showing the shape thereof.
Figure 4D:
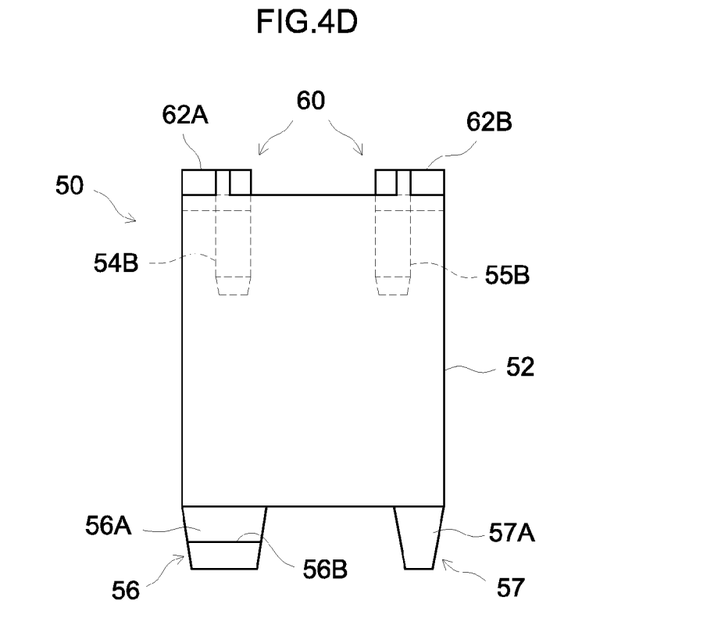
FIG. 4D is a front view of the board clip according to the embodiment showing the shape thereof.

Hereinafter, the frame 30 and the board clip 50 mountable on the outer side surface 30B of the frame 30 according to this embodiment will be described in detail with reference to the figures. FIG. 2 is a plan view schematically showing a structure of the frame 30 according to this embodiment, and FIG. 3 is a perspective view schematically showing the board clip 50 according to this embodiment in the state of being mounted on the frame outer side surface 30B. FIGS. 4A, 4B, 4C and 4D are respectively a perspective view, a side view, a plan view and a front view showing a shape of the board clip 50 according to this embodiment.

As shown in FIG. 2, the frame 30 according to this embodiment is a component which is frame-shaped as seen in a plan view, and is generally located on the rear side of the liquid crystal panel 10 and is formed so as to surround the rectangular display area 10A located in the central area of the liquid crystal panel 10. The peripheral portion of the liquid crystal panel 10 is located on an inner peripheral part of the front surface 30A of the frame 30. As shown in FIG. 3, the circuit board 16, connected to the peripheral portion of the liquid crystal panel 10 located on the inner part of the front surface 30A via the flexible wiring board 14, is guided to go over the front surface 30A of the frame 30 to the outer side surface 30B utilizing the flexibility of the flexible wiring board 14 and is located on the outer side surface 30B.

As shown in FIG. 2, the frame 30 according to this embodiment is formed by coupling four frame components 32 through 35, which are L-shaped as seen in a plan view, to each other. Specifically, a pair of first frame components 32 and 34 having point symmetry with respect to the center of the frame 30, and a pair of second frame components 33 and 35 also having point symmetry with respect to the center of the frame 30, are coupled to each other such that generally central positions of longer sides 30E of the frame 30 and generally central positions of shorter sides 30F of the frame 30 are coupling portions 38. In this manner, the frame 30 of the frame-like shape according to this embodiment is structured. For carrying out the present invention, the frame 30 is not limited to being formed of four components 32 through 35. For example, the frame may be formed by coupling two frame components, which are generally C-shaped as seen in a plan view, to each other, or the frame may be formed of one component.

Now, a structure and functions of the board clip 50 according to this embodiment will be described. In the following description, as shown in FIG. 3, the board clip 50 is mounted at the coupling portion 38 of the first frame component 32 and the second frame component 33 on one of the longer sides 30E of the frame 30 (i.e., mounted at the generally central position of the one longer side 30E). The board clip 50 is mounted as bridging over the two frame components 32 and 33. The attaching position of the board clip 50 is not limited to the coupling portion 38.

As shown in FIGS. 4A through 4D, the board clip 50 according to this embodiment is formed of an insulating material such as a synthetic resin of polypropylene, polycarbonate or the like. A board clip of a desirable shape can be produced by injection molding or the like by use of such a synthetic resin material.

The board clip 50 according to this embodiment includes a plate-like main body portion 52 located so as to face the outer side surface 30B of the frame 30 when being mounted at a prescribed position (see FIG. 3).

At one end of the main body portion 52, i.e., the end located on the front side of the frame 30 when the board clip 50 is mounted, a pair of, i.e., left and right, front-side engaging portions 54 and 55 are formed in the vicinity of two ends of the main body portion 52 in a width direction thereof. At the other end of the main body portion 52, i.e., at the end which is located on the rear side of the frame 30 when the board clip 50 is mounted, a pair of, i.e., left and right, rear-side engaging portions 56 and 57 are formed in the vicinity of two ends of the main body portion 52 in the width direction thereof. On a top surface of the front-side engaging portions 54 and 55 (i.e., on a surface facing the bezel 20 when the board clip 50 is mounted), a bezel receiving portion 60 according to this embodiment is formed. Hereinafter, this will be described in detail.

As shown in the figures, the pair of front-side engaging portions 54 and 55 according to this embodiment are formed to be bilaterally symmetrical to each other. More specifically, the front-side engaging portions 54 and 55 according to this embodiment respectively include extending portions 54A and 55A protruding toward the center of the liquid crystal panel 10 when the board clip 50 is mounted at the prescribed mounting position (see FIG. 3), and front-side engaging claws 54B and 55B projecting (extending) from positions in the vicinity of the tips of the extending portions 54A and 55A toward the rear side of the liquid crystal panel 10 (liquid crystal display device 100) (therefore, the front-side engaging claws 54B and 55B are parallel to the main body portion as shown in the figures).

The bezel receiving portion 60 according to this embodiment includes ridges (cross-shaped ribs) 62A and 62B projecting toward the front side of the panel, respectively from the top surfaces of the extending portions 54A and 55A of the front-side engaging portions 54 and 55 protruding toward the center of the liquid crystal panel 10 (i.e., from the surfaces of the extending portions 54A and 55A facing the bezel 20 when the board clip 50 is mounted). The ridges 62A and 62B are cross-shaped as seen in the top surfaces thereof. Top ends of the ridges 62A and 62B have same height and are flat.

The pair of rear-side engaging portions 56 and 57 according to this embodiment are formed to be bilaterally asymmetrical to each other. More specifically, the rear-side engaging portions 56 and 57 according to this embodiment respectively have a relatively wide first rear-side engaging claw 56A and a relatively narrow second rear-side engaging claw 57A, both of which project (extend) from the other end of the main body portion 52 toward the rear side of the liquid crystal panel 10 (liquid crystal display device 100) when the board clip 50 is mounted at the prescribed mounting position (see FIG. 3).

Owing to such a bilaterally asymmetrical pair of rear-side engaging portions 56 and 57 (engaging claws 56A and 57A), the operator can easily recognize the correct orientation (direction) of the board clip 50 when mounting the board clip 50 on the frame outer side surface 30B. This prevents an operational error that the board clip 50 is mounted in an opposite orientation, and the board clip 50 can be mounted in the correct orientation efficiently and accurately. In this embodiment, the rear-side engaging portions are bilaterally asymmetrical to each other, but substantially the same effect can be provided when the front-side engaging portions are bilaterally asymmetrical to each other.

The wider first rear-side engaging claw 56A has a tapered tip, and an engaging step 56B is formed in the vicinity of the center of the engaging claw 56A.

Now, a mechanism for mounting the board clip (clip attaching portion) formed on the frame 50 side will be described.

Figure 5:
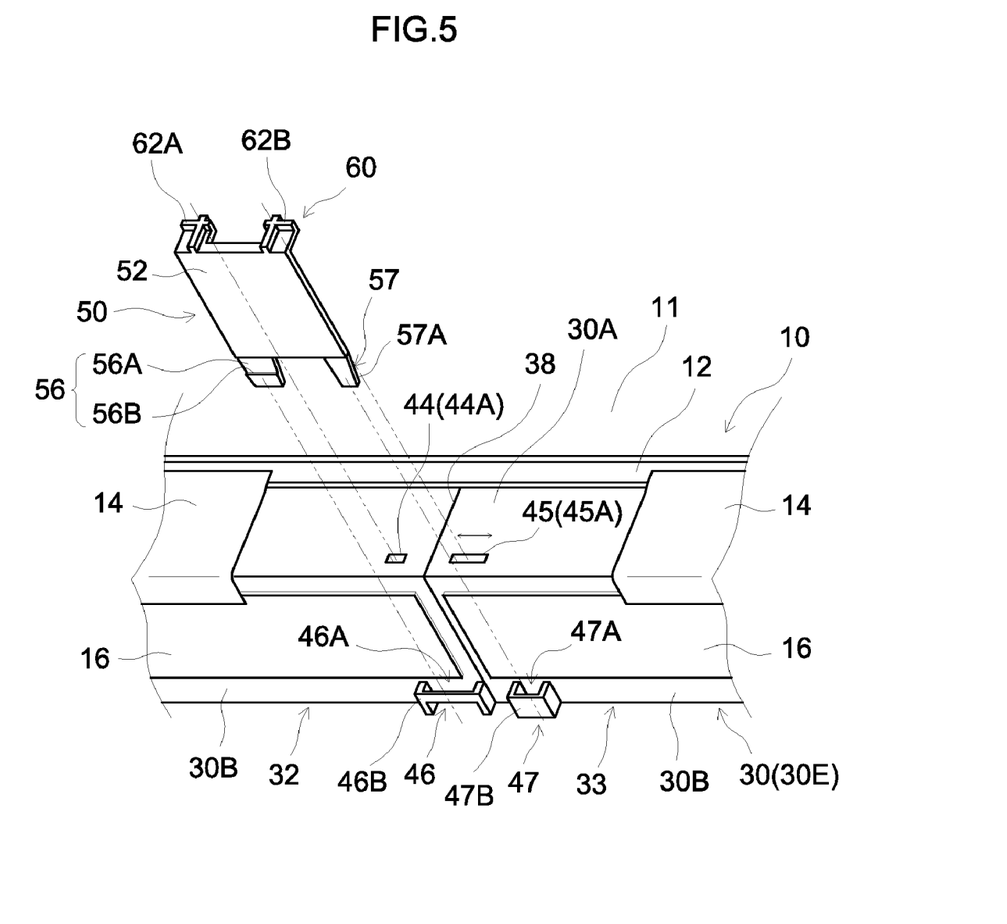
FIG. 5 is a perspective view schematically showing the board clip according to the embodiment and a position at which the clip is mounted.

As shown in FIG. 5, a pair of front-side engaging holes 44A and 45A acting as front-side clip attaching portions 44 and 45 according to this embodiment are formed in an outer peripheral part of the front surface 30A of the frame 30 (longer side 30E), at positions which correspond to the pair of front-side engaging claws 54B and 55B mentioned above when the board clip 50 is mounted at the prescribed position.

More specifically, as shown in the figure, in this embodiment, the engaging hole 44A formed in the front surface 30A of the first frame component 32 has such a size that receives the corresponding engaging claw 54B in a fitting manner, whereas the engaging hole 45A formed in the front surface 30A of the second frame component 33 has a long groove shape which is longer, in a direction along the longer side 30E, than the corresponding engaging claw 55B.

At positions which correspond to the pair of rear-side engaging claws 56A and 57A when the board clip 50 is mounted at the prescribed mounting position, a pair of engaging holes 46A and 47A acting as rear-side clip attaching portions 46 and 47 according to this embodiment are formed.

Figure 6:
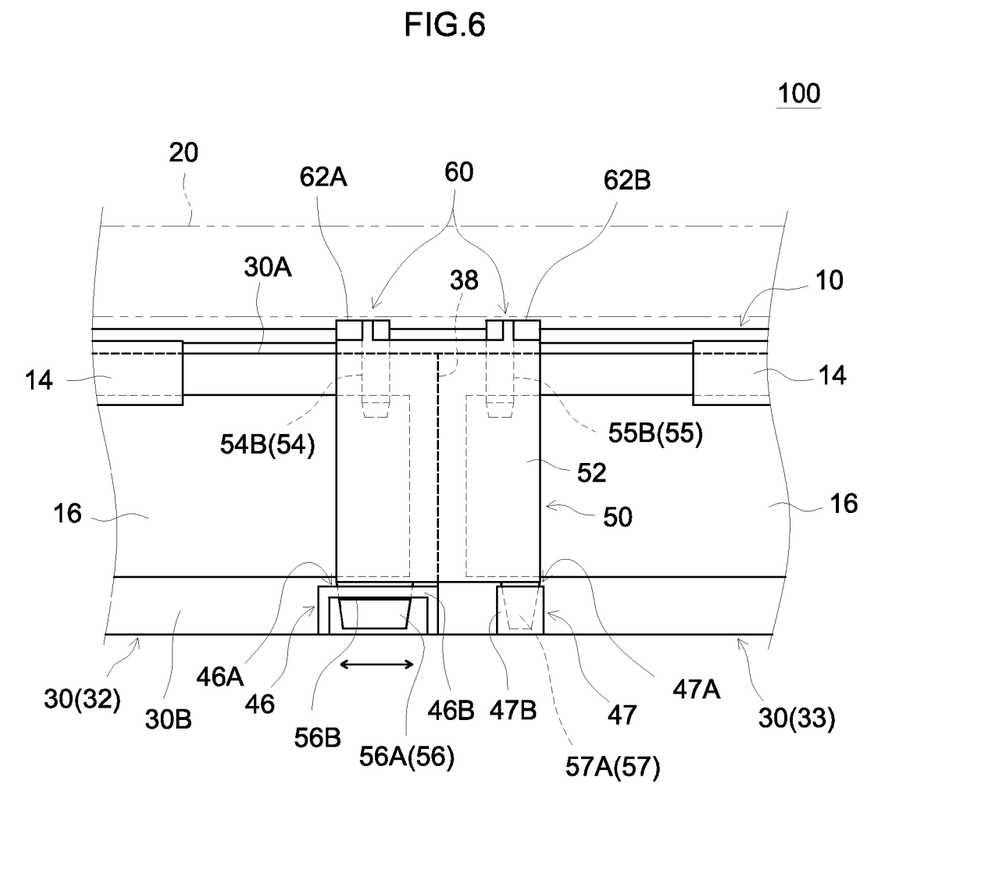
FIG. 6 shows, from the side of the outer side surface of the frame, the board clip according to the embodiment in the state of being mounted on the outer side surface of the frame.

More specifically, as shown in the figure, in this embodiment, the first rear-side engaging hole 46A engageable with the engaging claw 56A of the corresponding first rear-side engaging portion 56, and a surrounding wall 46B defining the engaging hole 46A, are formed in a lower part (i.e., a part closer to the backlight device 70) of the outer side surface of the first frame component 32. A surface of the surrounding wall 46B, the surface facing the frame outer side surface 30B, is opened downward. When the tapered tip of the engaging claw 56A is located in the opening, as shown in FIG. 6, an edge of the surrounding wall 46B is engaged with (hung on) the engaging step 56B. As a result, the board clip 50 can be prevented with certainty from coming off (falling) from the clip attaching portion 46. As shown in the figure, the first rear-side engaging hole 46A has a long groove shape which is longer, in a direction along the longer side 30E, than the width of the first rear-side engaging claw 56A.

As shown in the figure, in this embodiment, the second rear-side engaging hole 47A engageable with the engaging claw 57A of the corresponding second rear-side engaging portion 57, and a surrounding wall 47B defining the engaging hole 47A, are formed in a lower part (i.e., a part closer to the backlight device 70) of the outer side surface of the second frame component 33. As shown in the figure, the second rear-side engaging hole 47A has such a size that receives the second rear-side engaging claw 57A in a fitting manner.

As shown in FIG. 5 as well as FIGS. 4 and 6, for constructing the liquid crystal display device, the circuit board 16 connected to the tip side of the flexible wiring board 14, which is connected to the liquid crystal panel 10 placed on the front surface 30A of the frame 30, is located on the outer side surface 30B of the frame 30. In this embodiment, different circuit boards 16 are located on the outer side surface 30B of the first frame component 32 and on the outer side surface 30B of the second frame component 33, with the coupling portion 38 interposed therebetween. Ends of these two circuit boards 16, namely, the ends, of the two circuit boards 16, adjacent to each other with the coupling portion 38 interposed therebetween can be held by one board clip 50.

Specifically, while the ends of the two circuit boards 16 are held between the plate-like main body portion 52 of the board clip 50 and the frame outer side surface 30B, the pair of front-side engaging claws 54B and 55B are respectively inserted into, and engaged with, the corresponding front-side engaging holes 44A and 45A, and also the pair of rear-side engaging claws 56A and 57A are respectively inserted into, and engaged with, the corresponding rear-side engaging holes 46A and 47A. The front side and the rear side of the board clip 50 (main body portion 52) are each attached to the frame 30 via one pair of engaging portions (front-side engaging portions 54 and 55, and the rear-side engaging portions 56 and 57) in this manner, and thus stable mounting can be realized.

In this embodiment, in the state where the bezel 20 is placed on the top surfaces (surfaces facing the bezel) of the ridges 62A and 62B of the bezel receiving portion 60 of the board clip 50 mounted on the outer side surface 30B of the frame 30 as described above, the bezel receiving portion 60 being on the front side of the panel, a part of a peripheral portion of the bezel 20 is in contact with the ridges 62A and 62B of the bezel receiving portion 60 (see FIG. 6).

Accordingly, in the liquid crystal display device 100 according to this embodiment, as shown in FIG. 6, the board clip 50 is prevented from moving unsteadily because the bezel 20 in contact with the bezel receiving portion 60 (ridges 62A and 62B) acts as a barrier, and therefore, the circuit board 16 can be stably held on the outer side surface 30B of the frame 30. In addition, since the ridges (ribs) 62A and 62B are provided, the mechanical strength of the bezel receiving portion can be improved as compared with a bezel receiving portion of a simple plate-like (flat) shape.

In the liquid crystal display device 100 according to this embodiment, as described above, one of the pair of front-side engaging holes 44A and 45A, i.e., the engaging hole 45A, is formed to have a long groove shape; and one of the rear-side engaging holes 46A and 47A, i.e., the engaging hole 46A, is formed to have a long groove shape. Therefore, even when the frame 30 has a processing error or is thermally contracted and the distance between the engaging holes of such a pair is changed due to the error or the thermal contraction, such a change can be compensated for by the long groove. This can prevent an inconvenience that the board clip cannot be mounted or the board clip is broken due to a stress caused by the change in the distance between the engaging holes after the board clip is mounted.

In this embodiment, regarding the board clip 50 to be mounted as bridging over the coupling portion 38 of the two frame components 32 and 33, among the pair of front-side engaging holes 44A and 45A and the pair of rear-side engaging holes 46A and 47A, the front-side engaging hole 45A and the rear-side engaging hole 46A diagonally located to each other are formed to have a long groove shape. This arrangement is made in consideration of the case where the coupling portion 38 is bent (deformed) in the front-rear direction of the panel when the processing error or the thermal contraction occurs. In the case where, for example, the frame is formed of one component, or in the case where the frame is formed of two or more components but the board clip is to be mounted at a position other than the coupling portion as described above, it is preferable that the front-side engaging hole and the rear-side engaging hole located on the same side as seen from the front side of the board clip 50 are formed to have a long groove shape. For example, in the case of the board clip 50 according to this embodiment shown in FIG. 6, it is preferable that the front-side engaging hole 45A and the rear-side engaging hole 47A, or the front-side engaging hole 44A and the rear-side engaging hole 46A, are formed to have a long groove shape. In this manner, the portions in which long grooves are to be formed may be selected in consideration of the mounting position of the board clip 50 and the direction of the processing error or the thermal contraction of the frame (whether an error in the longitudinal direction mainly occurs, or a deformation in the front-rear direction of the panel mainly occurs).

So far, the present invention has been described by way of a preferable embodiment thereof. The above description does not limit the present invention, and various modifications are possible, needless to say.

For example, in the above embodiment, the ridges 62A and 62B are formed to be cross-shaped, but the present invention is not limited to such a shape of the ridges. As long as the bezel 20 can be in contact with the ridges stably (i.e., as long as the board clip can be pressed by the bezel 20 and so suppressed from moving unsteadily), the ridges may be formed in any of various shapes (e.g., in a shape of a plurality of concentric circles).

The board clip 50 is not limited to being mounted at the border position 38 between the frame components 32 and 33, and may be mounted at any position on the frame outer side surface 30B in accordance with the position at which the circuit board 16 is to be located.

Industrial Applicability

The present invention provides a board clip which can be kept mounted stably on an outer side surface of the frame. Utilizing such a board clip, a liquid crystal display device which can stably hold, on the outer side surface of the frame, at least a part of the circuit board connected to the liquid crystal panel via the flexible wiring board can be provided.

DESCRIPTION OF REFERENCE CHARACTERS

10 Liquid crystal panel
11 Color filter (CF) substrate
12 Array substrate
14 Flexible wiring board
16 Circuit board
20 Bezel
30 Frame
30A Front surface
30B Outer side surface
30E Longer side
30F Shorter side
32, 34 First frame component
33, 35 Second frame component
38 Coupling portion
44, 45 Front-side clip attaching portion
44A, 45A Engaging hole
46, 47 Rear-side clip attaching portion
46A, 47A Engaging hole
46B, 47B Surrounding wall
50 Board clip
52 Main body portion
54, 55 Front-side engaging portion
54A, 55A Extending portion
54B, 55B Engaging claw
56 First rear-side engaging portion
56A Engaging claw
56B Engaging step
57 Second rear-side engaging portion
57A Engaging claw
60 Bezel receiving portion
62A, 62B Ridge
70 Backlight device
100 Liquid crystal display device

The invention claimed is:

1. A liquid crystal display device, comprising:
a liquid crystal panel having a rectangular shape;
a frame of a frame-like shape located on the rear side of the liquid crystal panel; and
a bezel of a frame-like shape located on the front side of the liquid crystal panel;
wherein:
the liquid crystal panel is held between the frame and the bezel;
a peripheral portion of at least one side of the liquid crystal panel is connected to a circuit board via a flexible wiring board;
at least a part of the circuit board is held on an outer side surface of the frame by a board clip mounted on the outer side surface of the frame;
the board clip includes a plate-like main body portion located so as to face the outer side surface of the frame when the board clip is mounted, a front-side engaging portion provided at one end of the main body portion and engaged with a front-side clip attaching portion provided in the frame when the board clip is mounted, and a rear-side engaging portion provided at the other end of the main body portion and engaged with a rear-side clip attaching portion provided in the frame when the board clip is mounted; and
the board clip further has a bezel receiving portion formed in the vicinity of the front-side engaging portion and contactable with a part of a peripheral portion of the bezel when the bezel is located at a prescribed position such that the liquid crystal panel is held.

2. The liquid crystal display device of claim 1, wherein:
the board clip includes a pair of front-side engaging claws extending from the one end of the main body portion as the front-side engaging portion, and a pair of rear-side engaging claws extending from the other end of the main body portion as the rear-side engaging portion; and
the frame has a pair of front-side engaging holes and a pair of rear-side engaging holes which are respectively formed at positions corresponding to the pair of front-side engaging claws and the pair of rear-side engaging claws and are respectively engageable with the pair of front-side engaging claws and the pair of rear-side engaging claws.

3. The liquid crystal display device of claim 2, wherein either one of the pair of front-side engaging holes is formed to have a long groove shape, and either one of the pair of rear-side engaging holes is formed to have a long groove shape.

4. The liquid crystal display device of claim 1, wherein:
the front-side engaging portion is formed to protrude from the one end of the main body portion toward the center of the liquid crystal panel when the board clip is mounted on the outer side surface of the frame, and
on a surface of the front-side engaging portion protruding toward the center of the liquid crystal panel, the surface facing the bezel, a ridge projecting toward an area where the bezel is located is formed as the bezel receiving portion.

5. A board clip, for holding a circuit board, provided in a liquid crystal display device which includes a liquid crystal panel having a rectangular shape, a frame of a frame-like shape located on the rear side of the liquid crystal panel, and a bezel of a frame-like shape located on the front side of the liquid crystal panel, the board clip being mounted on the frame for holding, on an outer side surface of the frame, at least a part of the circuit board connected to a peripheral portion of the liquid crystal panel held between the frame and the bezel via a flexible wiring board, the board clip comprising:
a plate-like main body portion located so as to face the outer side surface of the frame when the board clip is mounted on the frame;

a front-side engaging portion provided at an end of the main body portion and engaged with a front-side clip attaching portion provided in the frame when the board clip is mounted;

a rear-side engaging portion provided at the other end of the main body portion and engaged with a rear-side clip attaching portion provided in the frame when the board clip is mounted; and a bezel receiving portion formed in the vicinity of the front-side engaging portion and contactable with a part of a peripheral portion of the bezel when the bezel is located at a prescribed position such that the liquid crystal panel is held.

6. The board clip of claim 5, including:

a pair of front-side engaging claws extending from the one end of the main body portion as the front-side engaging portion; and a pair of rear-side engaging claws extending from the other end of the main body portion as the rear-side engaging portion.

7. The board clip of claim 5, wherein:

the front-side engaging portion is formed to protrude from the one end of the main body portion toward the center of the liquid crystal panel when the board clip is mounted on the outer side surface of the frame; and on a surface of the front-side engaging portion protruding toward the center of the liquid crystal panel, the surface facing the bezel, a ridge projecting toward an area where the bezel is located is formed as the bezel receiving portion.

* * * * *